US006545481B1

United States Patent
Emberty et al.

(10) Patent No.: US 6,545,481 B1
(45) Date of Patent: Apr. 8, 2003

(54) POWER INTERRUPTION DETECTION

(75) Inventors: Robert George Emberty, Tucson, AZ (US); Eric Y. K. Hew, Tucson, AZ (US); Craig Anthony Klein, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/716,750

(22) Filed: Nov. 20, 2000

(51) Int. Cl.$^7$ .............................................. G01R 31/08
(52) U.S. Cl. .................................. 324/521; 340/310.01
(58) Field of Search .................................. 324/521, 606, 324/607, 617; 307/64, 87; 700/286; 375/327, 373, 376; 340/286, 310.01, 657, 658, 825.7, 825.71, 870.25, 310.05

(56) References Cited

U.S. PATENT DOCUMENTS

| | | | | |
|---|---|---|---|---|
| 4,039,938 A | * | 8/1977 | Link | 324/52 |
| 4,704,574 A | * | 11/1987 | Nossen | 324/83 D |
| 4,783,728 A | | 11/1988 | Hoffman | 363/37 |
| 4,916,329 A | | 4/1990 | Dang et al. | 307/66 |
| 5,124,594 A | * | 6/1992 | Numata et al. | 307/528 |
| 5,194,816 A | * | 3/1993 | Steele | 324/529 |
| 5,315,533 A | | 5/1994 | Stich et al. | 364/480 |
| 5,473,533 A | | 12/1995 | Mengelt | 364/152 |
| 5,596,280 A | * | 1/1997 | Riggio et al. | 324/606 |
| 5,602,462 A | | 2/1997 | Stich et al. | 323/258 |
| 5,670,833 A | | 9/1997 | Mengelt et al. | 307/66 |
| 5,790,391 A | | 8/1998 | Stich et al. | 363/24 |
| 5,923,830 A | | 7/1999 | Fuchs et al. | 395/182.09 |
| 5,936,430 A | * | 8/1999 | Patterson | 327/12 |
| 5,963,539 A | * | 10/1999 | Webbler et al. | 370/123 |

\* cited by examiner

Primary Examiner—N. Le
Assistant Examiner—Etienne P. LeRoux
(74) Attorney, Agent, or Firm—Grossman, Tucker, Perreault & Pfleger, PLLC

(57) ABSTRACT

An AC power interruption detection system is provided which compares an AC signal with a phased AC reference signal to determine the presence or absence of an AC power signal. By comparing the AC power signal with a phased reference signal, power interruption detection occurs within a predetermined minimum time frame, for example, with ½ cycle. In exemplary embodiments, the detection system includes AC power signal frequency multiplying circuitry to improve speed and performance. In other exemplary embodiments, the detection system includes threshold detection circuitry to detect undervoltage (e.g., brownout) and/or overvoltage (e.g., spike) conditions of the AC power. In system-level embodiments, the interruption detection system is implemented in a switch array environment in which a switch controller controls a redundant switch array based on the detection signal generated by the power interruption detection system to couple a selected AC power line, from one or more redundant AC power lines available, to a load.

8 Claims, 4 Drawing Sheets ures. The following description will explain the function of one of them.

POWER INTERRUPTION DETECTION

BACKGROUND OF THE INVENTION

1. Field of the Invention

The present invention relates to a system and methodology for providing high- speed detection of faults in an AC power line by using phase-locking techniques to detect a power interruption or power degradation within a predetermined minimum time period.

2. Description of Related Art

Numerous power management systems exist which monitor an AC power line, and upon failure of the AC power, couple a battery backup system to a load. For example, U.S. Pat. No. 4,916,329 issued to Dang et al. discloses an uninterruptible power supply which monitors variations in a single AC power supply and decides, based on certain threshold limitations, whether to couple a backup battery supply to a load. Similar examples can be found in U.S. Pat. Nos. 5,790,391; 5,670,833; 5,602,462; and 4,916,329.

However, in certain applications, it is impractical to design a redundant power supply system based on a battery backup system since some loads will quickly deplete a battery. Such implementations require one or more redundant AC power lines to provide continuous power to the load. Thus, there is a need to provide a control system for controlling a power line selection to a load. There also exists a need to provide a detection mechanism which can detect a failed power line within a minimum time frame so that a redundant power line can be quickly applied to a load. Also, since certain load elements are sensitive to AC power voltage variations, for example, brownout conditions and/or spike conditions, there exists a need to detect such conditions on a given power line, and if such condition exists, couple a redundant power line to the load.

SUMMARY OF THE INVENTION

Accordingly, the present invention solves the drawbacks of prior art redundant AC power supply systems by providing a detection system that monitors multiple AC power lines to ensure that the most viable AC power line is coupled to the load. Additionally, the present invention solves other drawbacks of prior art redundant AC power systems by providing threshold detection circuitry to monitor the signal condition of multiple AC power lines so that the power line connected to the load meets certain predetermined threshold conditions.

In one embodiment, the present invention provides a signal detection system, comprising an input AC signal; a trigger circuit receiving said AC signal and generating a digital signal;

a phase lock loop circuit receiving said digital signal and generating a phased digital signal such that said phased digital signal and said digital signal have overlapping values when said AC signal is present; and a latch circuit receiving said digital signal and said phased digital signal and latching said digital signal based on said phased digital signal, said latch circuit generating a detection signal indicative of the presence of said AC signal if said digital signal remains latched.

In another embodiment, the present invention provides an AC power line detection system to detect interruption of AC power, comprising an input AC signal; a trigger circuit receiving said AC signal and generating a digital signal; a phase lock loop circuit receiving said digital signal and generating a phased digital signal; a threshold detection circuit receiving said AC input signal and comparing said AC signal with a voltage threshold, and generating a second digital signal indicative of the presence and condition of said AC signal; and a latch circuit receiving said second digital signal and said phased digital signal and latching said second digital signal based on said phased digital signal, said latch circuit generating a detection signal indicative of the presence of said AC signal if said digital signal remains latched.

In still other system-level embodiments, the present invention provides a redundant power supply system-.adapted to detect power interruption of a redundant AC power line comprising: a plurality of available AC power signals; a reference signal generator circuit receiving a selected AC signal and generating a phased signal based on said AC signal; a detection circuit comparing said phased signal with said AC signal and generating a signal indicative of the presence of said AC signal; a switch controller receiving said- signal indicative of the presence of said AC signal and generating a control signal; and a switch array receiving said control signal and coupling said AC signal to a load if said AC signal is present.

It will be appreciated by those skilled in the art that although the following Detailed Description will proceed with reference being made to preferred embodiments and methods of use, the present invention is not intended to be limited to these preferred embodiments and methods of use. Rather, the present invention is of broad scope and is intended to be limited as only set forth in the accompanying claims.

Other features and advantages of the present invention will become apparent as the following Detailed Description proceeds, and upon reference to the Drawings, wherein like numerals depict like parts, and wherein:

In the examples described below with reference to FIGS. 1, 2 and 3, reference will be made to exemplary circuit implementations using a variety of analog and digital circuitry to accomplish the present invention. Those skilled in the art will readily recognize that the present invention may be implemented with a variety of analog and/or digital and/or mixed-mode circuitry, and the following are to be construed as examples of such implementation.

DETAILED DESCRIPTION OF EXEMPLARY EMBODIMENTS

Figure 1:
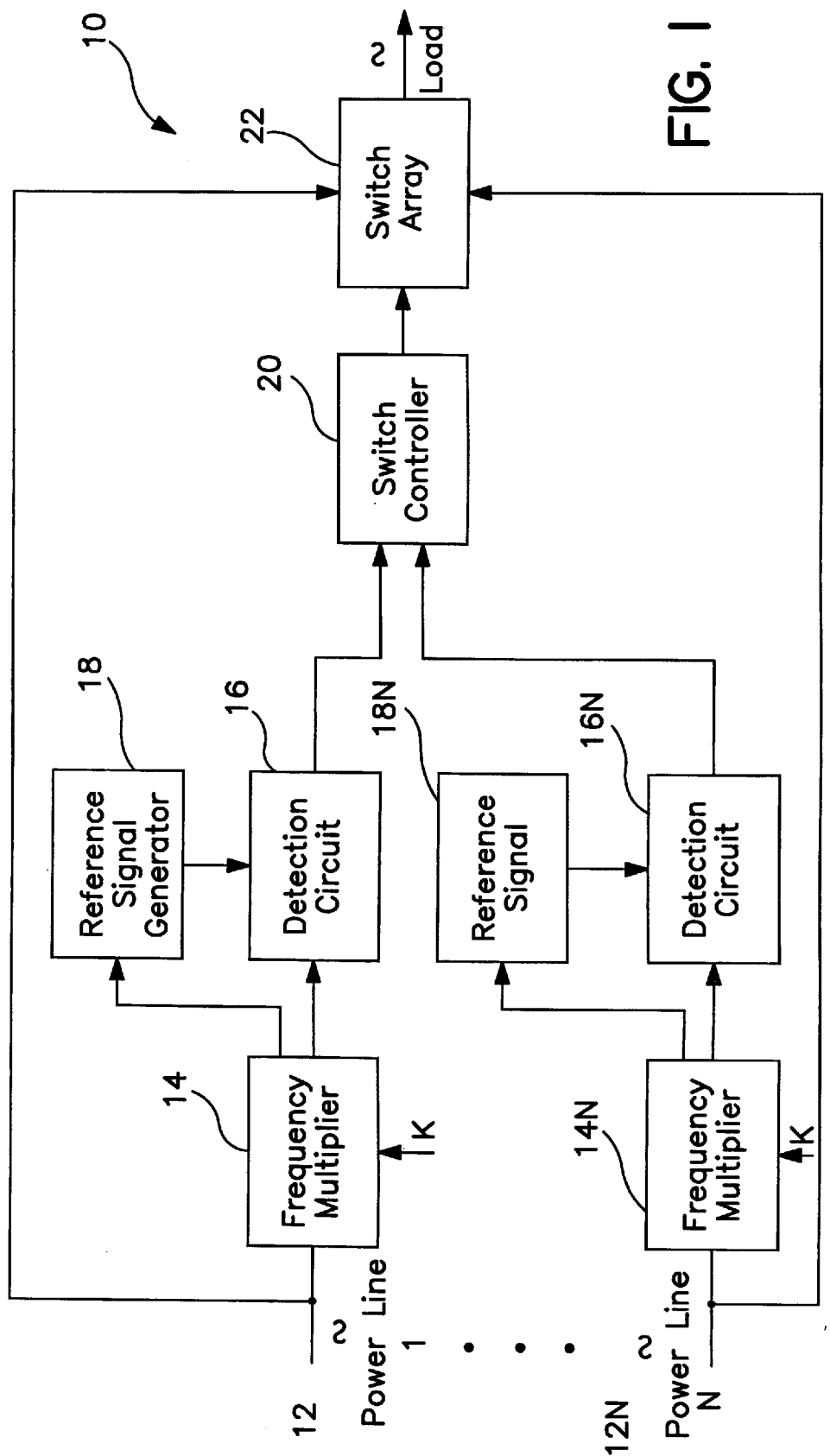
FIG. 1 is a block diagram representation of a power interruption detection system according to one example of the present invention.

FIG. 1 depicts a block diagram of an example of a power interruption detection system 10 of the present invention. The system 10 is designed to detect the presence of a signal on an available power line 12 ... 12n, and if a failure occurs on a particular power line, instruct a switch array to switch to another, viable power line, in a minimal time period. It should be noted that the present invention is intended to provide redundant switching between 2 or more available power sources. Thus, the circuitry 10 described herein may be duplicated for each source, as shown in FIG. 1 represented by an additional source line 12n and power interruption detection system 10, and as will become apparent in the following description.

The system 10 of FIG. 1 includes a frequency multiplier 14 coupled to a power line 12. In this example, power line 12 is an AC power source having a fixed frequency (e.g., 120 VAC at 50, 60 Hz.). The frequency multiplier multiplies the frequency of the input source 12 by a factor K. K can be chosen in accordance with the other components of the present invention (described below), or may include a user-selectable multiplying factor that sets a desired multiple of the frequency of the power source. In general, the present invention multiplies the input frequency so that detection of a failed power source occurs rapidly (e.g., within ½ cycle of the input power source 12). If, however, the timing of detection is not required, or is not critical for a particular application, it may be deemed unnecessary to provide the frequency multiplier 14.

The multiplied output of the frequency multiplier 14 is input into detection circuit 16. The multiplied output of the frequency multiplier 14 is also input into a reference signal generator 18. Reference signal generator 18 generates a reference signal based on the frequency of the signal generated by the frequency multiplier 14, and is used as a latch or reference signal by the detection logic 16. Reference signal generator 18 produces a phased reference signal, whose phase is determined by the characteristics of the AC power signal 12, or the multiplied signal, as will be described below. Detection circuit 16 receives the phased signal from the reference signal generator 18 and the multiplied signal and compares the two signals to determine the presence of the AC signal. For example, the phased signal and multiplied signal may be digitized, and input into a latch circuit. The latch circuit may be configured to produce a signal indicative of the presence of the AC power source by latching the multiplied signal using the phased signal as a clock.

Figure 2:
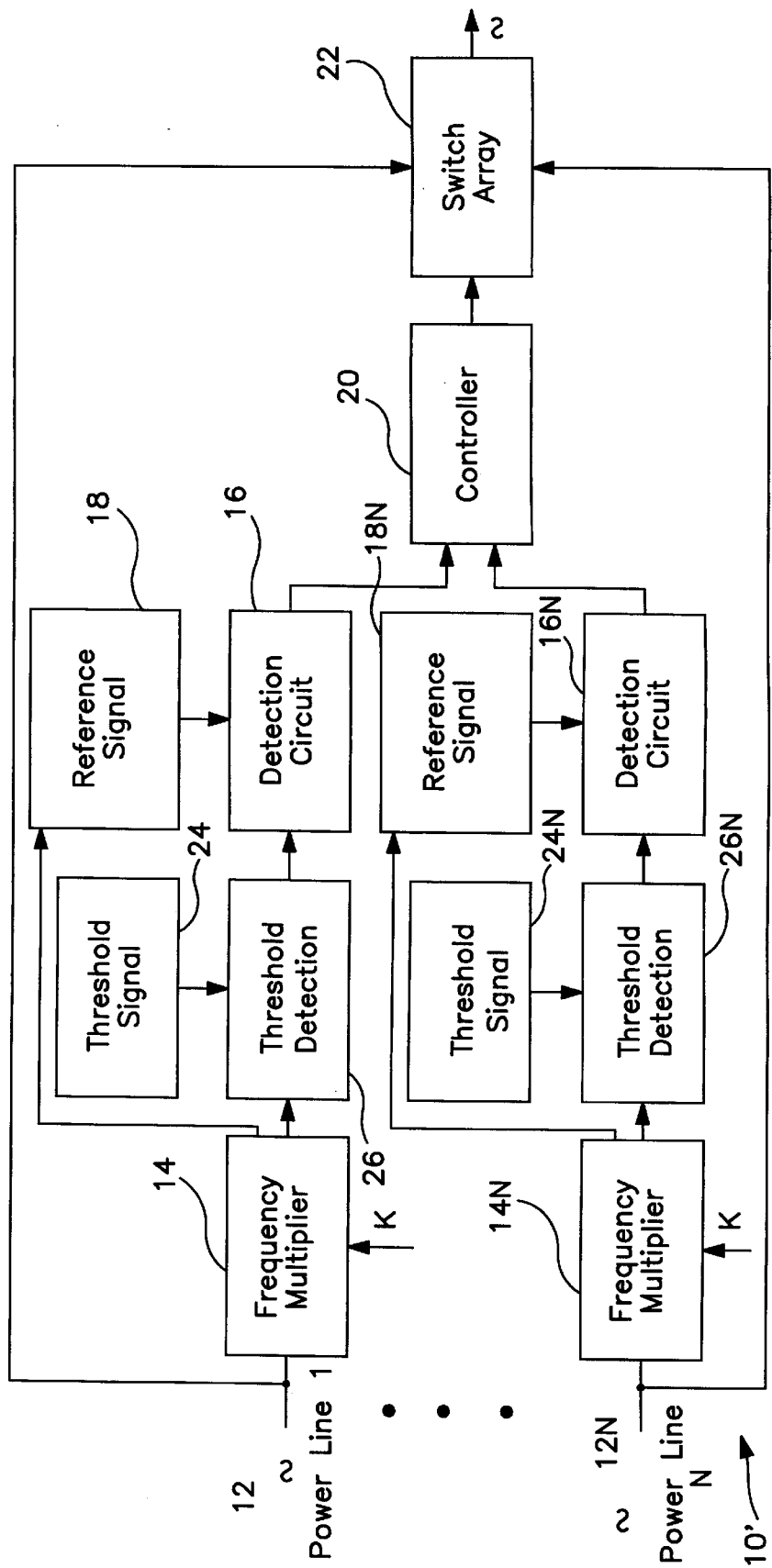
FIG. 2 is a block diagram representation of a power interruption detection system according to another example of the present invention.

FIG. 2 depicts a block diagram of another example of a power interruption detection system 10' of the present invention. The system 10' is similar to the system 10 of FIG. 1, but further includes threshold detection circuitry 26 that generates a signal indicative of the amplitude of the power source. For example, threshold detection circuitry may be used to detect undervoltage (brownout) or overvoltage (spike) conditions on the power line 12 . . . 12n. Accordingly, threshold detection circuitry 26 receives a threshold signal 24 for comparison. If the voltage is above or below the threshold signal, threshold detection circuitry generates an output to detection logic 16 indicative of the condition. In this case, controller 20 can instruct the switch array to switch over to another power line that is not in an undervoltage or overvoltage condition. Threshold signal can include a fixed reference voltage or a programmable reference voltage to generate a desired threshold signal.

Figure 3:
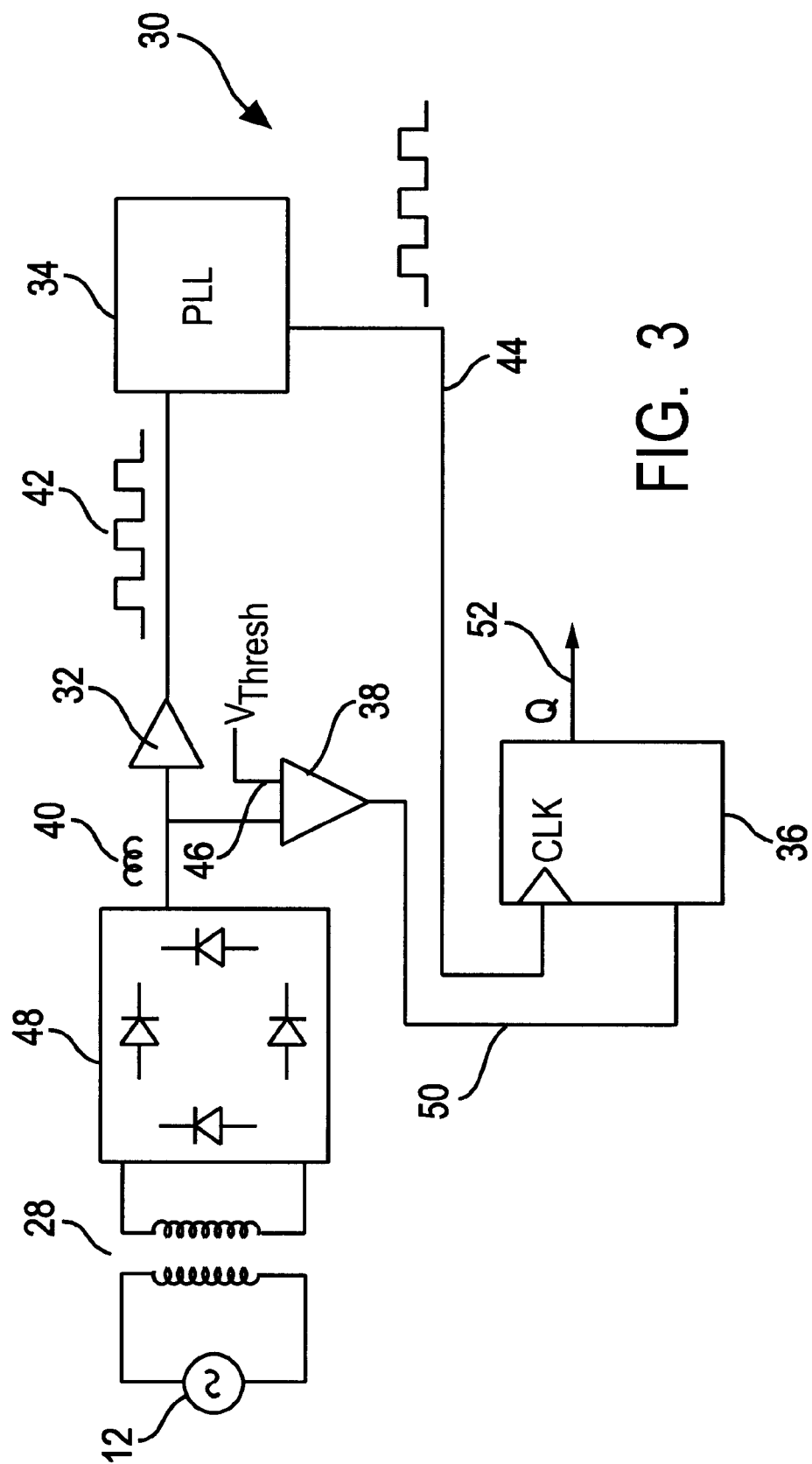
FIG. 3 is an exemplary circuit diagram of the power interruption detection system of FIG. 2.

FIG. 3 depicts a more detailed exemplary circuit diagram 30 the power interruption detection system of the exemplary block diagram of FIG. 2. The circuit 30 includes a step-down transformer 28 to reduce the voltage level of the input power line 12 to a manageable level. For example, since the circuit 30 of this example includes digital logic circuitry, it may be desirable to reduce the input voltage to about a logic level (e.g., 5 Volts RMS). In this example, the frequency multiplier may include a full wave rectifier circuit 48 that generates a rectified signal 40 having a frequency double the input frequency. Buffer circuit 32 receives the analog signal 40 and produces a digital signal 42 of the same frequency. Buffer circuit 32 may include hysteresis circuitry to produce the digital square wave pulse train as shown. Signal 42 is input into a PLL (phase lock loop) circuit 34 that generates a phased signal 44. Typically, a PLL will generate a signal 44 that is 90 degrees out of phase with signal 42, although other phase values may be equally applied without departing from the scope of the present invention (as described more fully below). Signal 44 is utilized as a clock signal to detect the presence of power on the power line 12.

To detect the condition of the voltage on the power line 12, a comparator 38 is provided to compare signal 40 to a threshold signal (Vthresh) 46. Comparator 38 generates signal 50 indicative of the condition of signal 40. In this example, comparator 38 is provided to detect an undervoltage condition on the power line 12. Thus, the output signal 50 is high logic level if the input signal 40 is equal to or greater than reference voltage 46. If not, signal 50 is a low logic signal. A flip-flop or data latch circuit 36 receives signal 50 as the trigger signal, and phased signal 44 as the clock (clk) signal. Referring to the timing diagram of FIG. 3A, the flip flop latches the output of the comparator 50, so long as signal 44 is high when signal 50 is high (as noted by the vertical dashed lines). If, however, no power is present on the power line, or if an undervoltage condition is signaled by comparator 38, the flip flop 36 generates a low detect signal 52. The detect signal 52 is supplied to the controller 20 (FIGS. 1 and 2) and the state of signal 52 determines how the controller 20 instructs the switch array to couple one of the power lines 12 . . . 12n to the load. In the example of FIG. 3, since the rectifier circuit 48 doubles the frequency of the input source voltage 12, the circuitry 30 can detect a failure (no voltage or undervoltage) of the power line 12 within ½ cycle of the power line signal. Thus, for example, if convention 120 Volt 60 Hz AC is used as the power line 12, the circuitry 30 ensures detection of a failure condition within ¹⁄₁₂₀ of a second (i.e., <10 ms). Those skilled in the art will readily recognize that a higher multiple of the frequency of the power line 12 decreases the detection time.

Figure 3A:
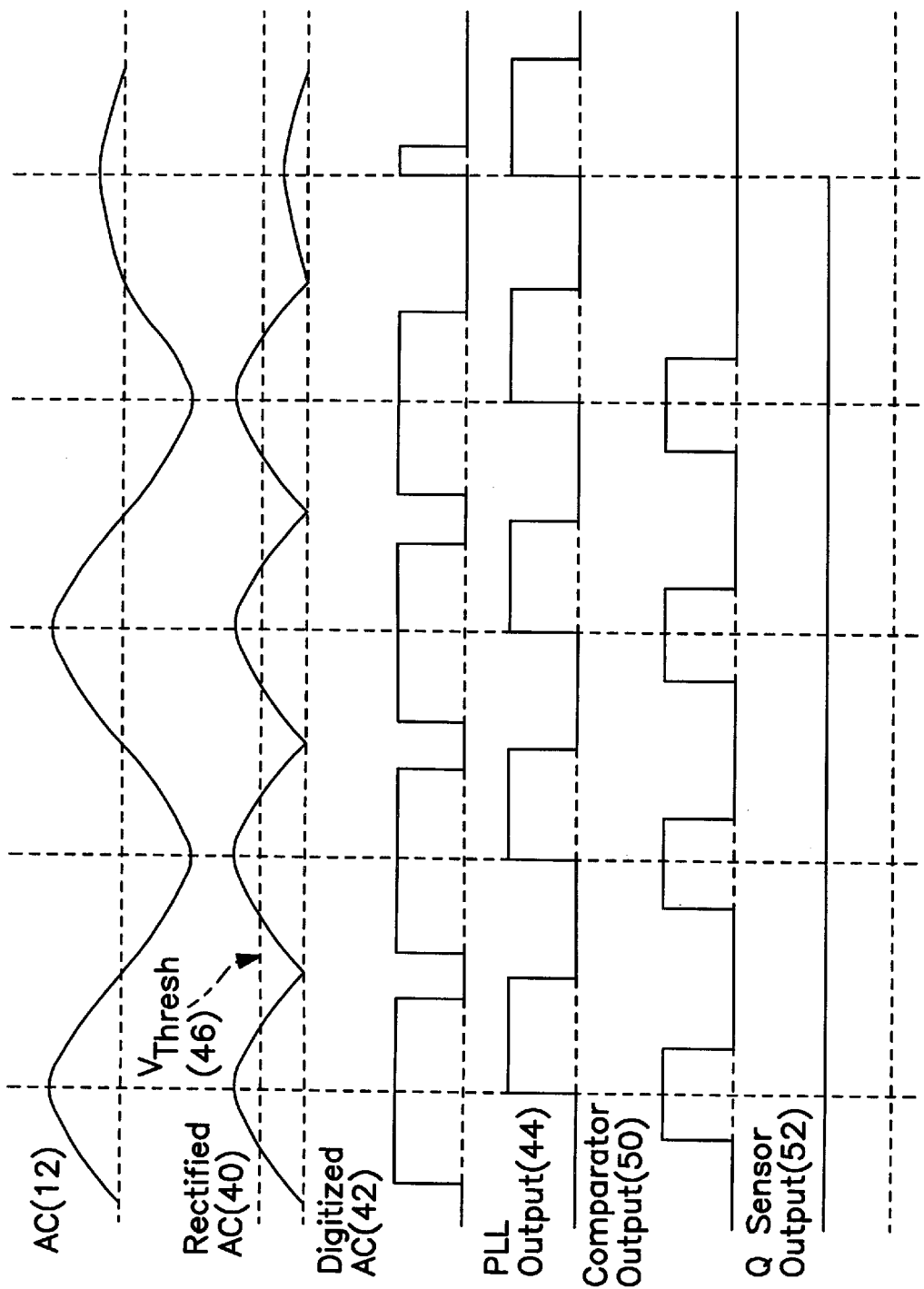

Referring again to FIG. 3A, the output 50 of the comparator generally has a narrower pulse width than that of phased signal 44, since the digital signal representation 42 of signal 40 has a greater signal amount at or above a logic high value, as determined by Vthresh 46. Thus, a phased signal 44 (generated by PLL 34) that has a phase value of 90 degrees with respect to signal 42 is sufficient since this arrangement ensures that, at least during normal power line operation, an overlap will exist between signal 50 and signal 42. FIG. 3A also depicts the input waveform 12 and the rectified waveform 40. Of course, a rectifier as shown in FIG. 3 is only one example of the type of frequency multiplier described in FIGS. 1 and 2. Thus, the reference signal generator 18 described above in reference to FIGS. 1 and 2 may include a general-purpose frequency multiplier circuit that does not rectify the signal (as shown in FIG. 3). The phase value generated by such a circuit may be fixed, or user-definable. In this case, the frequency multiple, k, and the phase value should be chosen so that during normal operation an overlap exists between signal 50 and 44 (i.e., so latch circuit 36 generates an accurate detection signal).

In some exemplary embodiments, controller 20 may comprise a general-purpose microprocessor programmed to instruct the switching array based on the value of the detect signals generated by the detection system described herein. Of course, controller 20 may alternatively comprise a state machine logic controller to accomplish the same result. Switch array may comprise a plurality of redundant relay switches, triac switches or other high voltage switch mechanisms known in the art, all of which are deemed as equivalents and are within the scope of the present invention. Moreover, certain examples of the present invention provide detection of a failure condition of a power line within a predetermined time frame. Thus, it may be desirable to utilize triac switches, since triac switches generally do not suffer from inertial effects that are prone to relay switches. The examples of FIGS. 1 and 2 include a switch controller 20 and a switch array 22 to couple redundant AC power lines 12 . . . 12n to a load. The switch array and controller are more fully described and claimed in U.S. patent application Ser. No. 09/76,313, filed Nov. 20, 2000, assigned to the same assignee. It should be understood that this is only an exemplary implementation, and such an implementation is not to be construed as limiting the present invention, and is provided only as one of many implementations that may be realized with the power interruption detection circuits of the present invention. Those skilled in the art will further recognize that numerous modifications may be made to the present invention, and all such modifications are deemed within the scope of the present invention, only as limited by the appended claims.

What is claimed is:

1. An AC power line detection system to detect interruption of AC power, comprising:
   an input AC signal;
   a buffer circuit receiving said AC signal and generating a first digital signal;
   a phase lock loop circuit receiving said first digital signal and generating a phased digital signal;
   a threshold detection circuit receiving said AC input signal and comparing said AC signal with a voltage threshold, and generating a second digital signal indicative of the presence and condition of said AC signal; and
   a latch circuit receiving said second digital signal and said phased digital signal and latching said second digital signal based on the overlap between said phased digital signal and said second digital signal, said latch circuit generating a detection signal indicative of the presence or absence of said AC signal.

2. A system as claimed in claim 1, further comprising a frequency multiplier circuit receiving said AC signal and generating a frequency multiplied AC signal and supplying said multiplied AC signal to said buffer circuit.

3. A system as claimed in claim 2, wherein said frequency multiplier comprises a full wave rectifier circuit generating a signal having a frequency double said input AC signal.

4. A system as claimed in claim 1, further comprising a step-down transformer receiving said input AC signal and generating another AC signal having less amplitude than said input AC signal.

5. A system to detect the presence and condition of an AC power line, comprising:
   an AC signal;
   a threshold detection circuit receiving said AC input signal and comparing said AC signal with a threshold voltage, and generating a signal indicative of the signal strength of said AC signal;
   a reference signal generator circuit receiving said AC signal and generating a phased signal based on said AC signal; and
   a detection circuit comparing said phased signal with said signal indicative of the signal strength of said AC signal, and generating a signal indicative of the presence or absence of said AC signal.

6. A system as claimed in claim 5, further comprising a step-down transformer receiving said input AC signal and generating another AC signal having less amplitude than said input AC signal.

7. A system as claimed in claim 5, wherein said reference signal generator comprises a phase lock loop circuit generating said phased signal, wherein the phase value for said phase lock loop chosen so that said signal indicative of the signal strength of said AC signal and said phased signal have overlapping periods.

8. A redundant power supply system adapted to detect power interruption of a redundant AC power line comprising:
   a plurality of available AC signals;
   a plurality of AC power line detection circuits, each circuit comprising:
      a threshold detection circuit receiving said AC input signal and comparing said AC signal with a threshold voltage, and generating a signal indicative of the signal strength of said AC signal;
      a reference signal generator circuit receiving a selected AC signal and generating a phased signal based on said AC signal;
      a detection circuit comparing said phased signal with said AC signal and generating a signal indicative of the presence of the said AC signal;
   a switch controller receiving said signals indicative of the presence or absence of said AC signals and generating a control signal; and
   a switch array receiving said control signal and coupling said AC signal to load if said AC signal is present.

* * * * *